US010353691B2

(12) United States Patent
Richter et al.

(10) Patent No.: US 10,353,691 B2
(45) Date of Patent: Jul. 16, 2019

(54) UPDATING ELECTRONIC CONTROLLER THROUGH TELEMATICS (71) Applicant: Cummins Inc., Columbus, IN (US)

(72) Inventors: Scott David Richter, Columbus, IN (US); Gorance V. Eftimovski, Columbus, IN (US); Prasanna Srinivasan, Columbus, IN (US); Michael F. Mattern, Columbus, IN (US); William A. Kivett, Columbus, IN (US); Ankit R Tarkas, Columbus, IN (US); Tomas Lopez Lauterio, Columbus, IN (US); Thomas J. Milvert, Columbus, IN (US); Troy D. Hamilton, Columbus, IN (US); John C. Wall, Belvedere, CA (US); Srikanth Namuduri, Columbus, IN (US)

(73) Assignee: Cummins Inc., Columbus, IN (US)

( * ) Notice: Subject to any disclaimer, the term of this patent is extended or adjusted under 35 U.S.C. 154(b) by 267 days.

(21) Appl. No.: 15/282,877

(22) Filed: Sep. 30, 2016

(65) Prior Publication Data
US 2018/0095742 A1 Apr. 5, 2018

(51) Int. Cl.
G06F 9/445 (2018.01)
H04L 29/08 (2006.01)
G06F 8/65 (2018.01)

(52) U.S. Cl.
CPC ............... *G06F 8/65* (2013.01); *H04L 67/12* (2013.01); *H04L 67/34* (2013.01); *Y04S 40/18* (2018.05)

(58) Field of Classification Search
CPC ............ G06F 8/65; H04L 67/34; H04L 67/12
See application file for complete search history.

(56) References Cited

U.S. PATENT DOCUMENTS 5,442,553 A 8/1995 Parrillo
5,815,071 A 9/1998 Doyle
(Continued)

FOREIGN PATENT DOCUMENTS

| JP | 2002-152234 | 5/2002 |
| JP | 2005-196568 | 7/2005 |
| WO | WO-02/10908 | 2/2002 |

OTHER PUBLICATIONS

International Search Report and Written Opinion for International Application No. PCT/US2017/053391, dated Nov. 27, 2017, 7 pages.

*Primary Examiner* — Anne M Antonucci
(74) *Attorney, Agent, or Firm* — Foley & Lardner LLP (57) ABSTRACT Systems and methods to update the calibration data of a control system includes a calibration system. The calibration system includes a first cloud connected application system structured to communicatively couple to a second cloud connected application system, determine, via at least one of the first cloud connected application system or the second cloud connected application system, a calibration update request corresponding to a control system, generate custom calibration data including preference data based on at least one of the calibration update request or the preference data, and provide the custom calibration data during at least one of an active engine state or an inactive engine state, wherein the custom calibration data is transmitted from the second memory portion to the first memory portion in response to the inactive engine state.

18 Claims, 4 Drawing Sheets

(56) References Cited

U.S. PATENT DOCUMENTS

| | | |
|---|---|---|
| 5,867,714 A | 2/1999 | Todd et al. |
| 6,127,947 A | 10/2000 | Uchida et al. |
| 6,181,994 B1 | 1/2001 | Colson et al. |
| 6,571,191 B1 | 5/2003 | York et al. |
| 6,589,708 B1 | 7/2003 | Katano et al. |
| 6,603,394 B2 | 8/2003 | Raichle et al. |
| 6,631,313 B2 | 10/2003 | Hayashi et al. |
| 6,647,322 B1 | 11/2003 | Hayashi et al. |
| 6,687,587 B2 | 2/2004 | Kacel |
| 6,760,650 B2 | 7/2004 | Shinichi et al. |
| 6,859,708 B2 | 2/2005 | Hashimoto et al. |
| 7,092,803 B2 | 8/2006 | Kapolka et al. |
| 7,152,133 B2 | 12/2006 | McClure et al. |
| 7,188,341 B1 | 3/2007 | Hawthorne et al. |
| 7,280,900 B2 | 10/2007 | Gault et al. |
| 7,346,435 B2 | 3/2008 | Amendola et al. |
| 7,366,589 B2 | 4/2008 | Habermas |
| 7,506,309 B2 | 3/2009 | Schaefer |
| 7,840,322 B2 | 11/2010 | Ross et al. |
| 7,894,861 B2 | 2/2011 | Grivas et al. |
| 8,655,541 B2 | 2/2014 | You |
| 9,419,802 B2 | 8/2016 | Lortz et al. |
| 2002/0019877 A1 | 2/2002 | Wrede |
| 2002/0133273 A1 | 9/2002 | Lowrey et al. |
| 2004/0078119 A1 | 4/2004 | Luitje et al. |
| 2004/0187011 A1 | 9/2004 | Lee et al. |
| 2005/0038581 A1 | 2/2005 | Kapolka et al. |
| 2005/0060070 A1 | 3/2005 | Kapolka et al. |
| 2005/0090941 A1 | 4/2005 | Stefan et al. |
| 2005/0216902 A1 | 9/2005 | Schaefer |
| 2006/0130033 A1 | 6/2006 | Stoffels et al. |
| 2007/0185624 A1 | 8/2007 | Duddles et al. |
| 2012/0041638 A1 | 2/2012 | Johnson et al. |
| 2013/0079950 A1* | 3/2013 | You ......................... H04L 67/34 701/1 |
| 2014/0109075 A1 | 4/2014 | Hoffman et al. |
| 2015/0128123 A1 | 5/2015 | Eling |
| 2016/0131069 A1 | 5/2016 | Wackerle et al. |
| 2016/0170733 A1 | 6/2016 | Martin et al. |

\* cited by examiner

UPDATING ELECTRONIC CONTROLLER THROUGH TELEMATICS

TECHNICAL FIELD

The present application relates generally to a calibration system for updating the calibration data of a control system through telematics.

BACKGROUND

Telematics refers to the combination of communications with information processing that is applicable in many fields, such as vehicles. Typically, vehicular telematics include a telematics unit communicably coupled to an electronic control system of the vehicle. The telematics unit receives data from the control system and provides that data to a third party telematics system (e.g., cloud or other computing location) and/or to the system of the electronic control system's manufacturer (e.g., cloud or other computing system). At times, the calibration data of the electronic control system needs to be updated to include new features, programmatic changes, etc. Traditionally, the equipment (e.g., the vehicle, engine, etc.) is brought into a service center or service personnel is dispatched to update the calibration data which results in the engine being unavailable while the calibration data is loaded into the electronic control system. Accordingly, a need exists for remote updates of the calibration data.

SUMMARY

One implementation relates to a system for updating the calibration data of a control system through telematics. The system includes a calibration system comprising a first cloud connected application system. The calibration system is structured to communicatively couple to a second cloud connected application system and a control system comprising a first memory portion and a second memory portion, determine, via at least one of the first cloud connected application system or the second cloud connected application system, a calibration update request corresponding to the control system, and generate custom calibration data comprising preference data based on the calibration update request. A telematics system is communicatively coupled to the calibration system, the telematics system is structured to provide the custom calibration data to the second memory portion during an active engine state. A telematics unit is communicatively coupled to the telematics system and the control system, the telematics unit is structured to generate a command structured to provide the custom calibration data to the first memory portion in response to an inactive engine state.

Another implementation relates to an apparatus including a calibration system. The calibration system comprises a cloud connected application system structured to determine, via the cloud connected application system, a calibration update request corresponding to a control system comprising a first memory portion and a second memory portion, generate custom calibration data comprising preference data based on at least one of the calibration update request or the preference data, and provide the custom calibration data during at least one of an active engine state or an inactive engine state, wherein the custom calibration data is transmitted from the second memory portion to the first memory portion in response to the inactive engine state.

Another implementation relates to a method comprising communicatively coupling a first cloud connected application system to a second cloud connected application system, determining, via at least one of the first cloud connected application system or the second cloud connected application system, a calibration update request corresponding to a control system, the control system comprising a first memory portion and a second memory portion, generating custom calibration data based on the calibration update request, providing the custom calibration data to the second memory portion during an active engine state, and generating a command structured to provide the custom calibration data to the first memory portion in response to an inactive engine state.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Embodiments described herein relate generally to an update management system for a control system, and in particular to a update management system that includes a calibration system coupled to a control system and a telematics system which is communicatively coupled to a telematics unit. In this regard, the calibration system may be structured to determine a calibration update request corresponding to the control system and generate custom calibration data based on the calibration update request. The telematics system may be provided by a third-party telematics provider (different than the control system manufacturer and different than the vehicle owner/operator) and may be structured to provide the custom calibration data to a second memory portion during an active engine state. In turn, the telematics unit may be structured to generate a command structured to provide the custom calibration data to a first memory portion in response to an inactive engine state.

Figure 1:
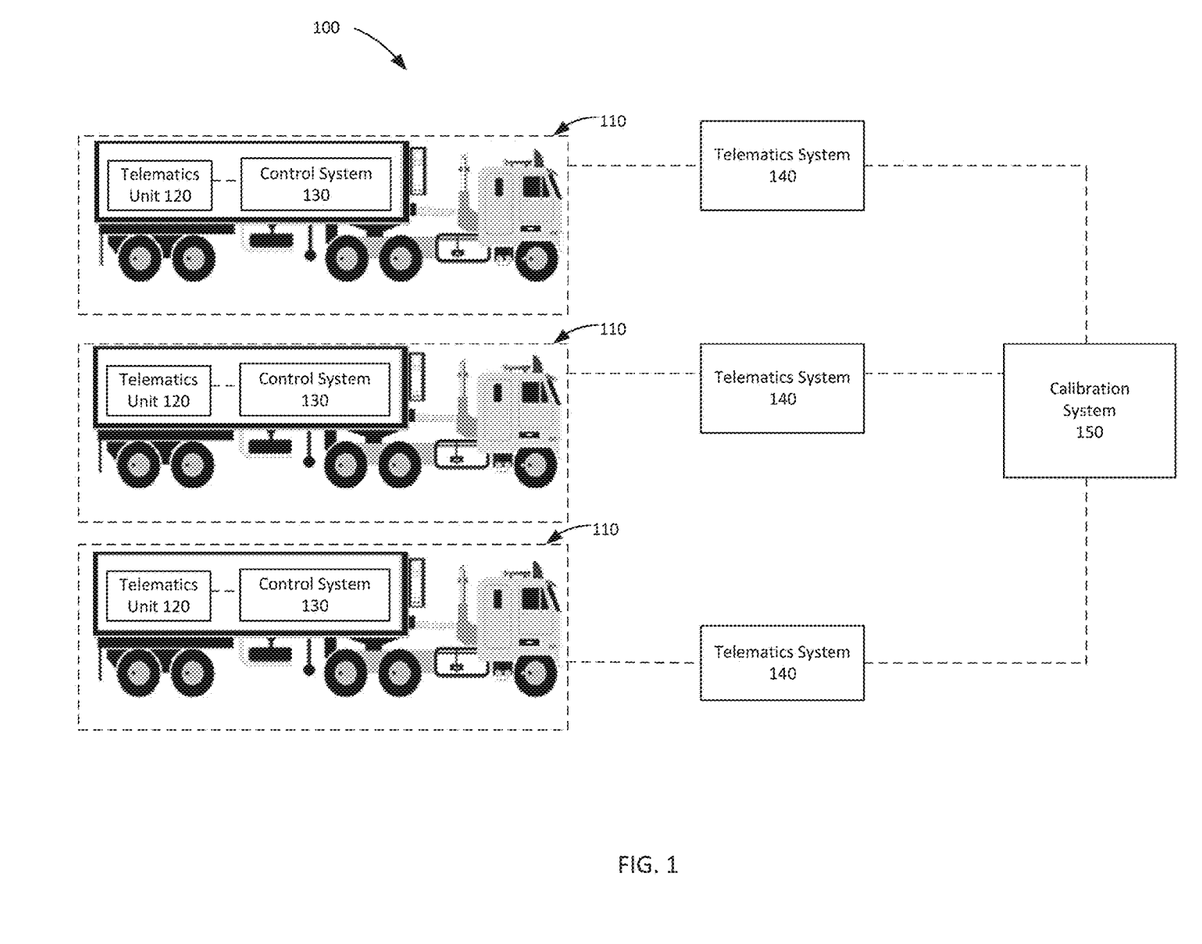
FIG. 1 is a schematic block diagram of an example update management system having an example control system.

With reference to FIG. 1, an update management system 100 is illustrated. The update management system 100 may be associated with the equipment 110. In the example of FIG. 1, the equipment 110 (e.g., a truck) each include one or more control systems 130 (e.g., electronic control systems). However, in other embodiments, the equipment 110 may be configured as a stationary application (e.g., a power generator). In some embodiments, the equipment may include, but is not limited to, on-road vehicles (e.g., trucks, buses, etc.), off-road vehicles (e.g., four-wheelers and ATVs, tractors, lawn mowers, snowmobiles, etc.), marine vessels (e.g., ships, submarines, boats, yachts, cruise ships, etc.), construction equipment (e.g., concrete trucks, hand-operated tools, loaders, boom lifts, etc.), mining equipment (e.g., mobile mining crushers, dozers, loaders, etc.), oil and gas equipment (e.g., drilling apparatuses, dozers, loaders, rigs, etc.), or any other type of vehicle. Accordingly, the equipment depiction and description contained herein is not meant to be limiting as other types of equipment may be associated with or otherwise used with the update management system 100. In this example embodiment, the update management system 100 includes a calibration system 150 (e.g., a first cloud connected application system or platform structured to utilize, execute, or otherwise access REST APIs), telematics system 140 (e.g., a second cloud connected application system or platform structured to utilize or otherwise access REST APIs), telematics unit 120, and a control system 130 (e.g., an electronic control system). At least one of the telematics system 140, the calibration system 150, or the telematics unit 120 is structured to operate wirelessly via over air transfer, a wireless chip, wireless circuit, wireless communication network, or combination thereof as described herein. It should be understood that the update management system 100 may include additional, less, and/or different components/systems than depicted in FIG. 1, such that the principles, methods, systems, apparatuses, processes, and the like of the present disclosure are intended to be applicable with any other update management system configuration.

As described above, the calibration system 150 is structured to operate wirelessly via a wireless chip, wireless circuit, wireless communication network (not shown), protocol, standard, or combination thereof, such as a cellular network, WiFi, Bluetooth®, local area network (LAN), wide area network (WAN), etc. Accordingly, the calibration system 150 may be communicatively coupled, via a network, the Internet, etc., to a control system (e.g., the control system 130) as described herein.

In certain embodiments, the calibration system 150 includes or is otherwise in communication with circuitry structured to functionally execute the operations of the calibration system 150. In further embodiments, the calibration system 150 may include a request detection circuit and/or a data generation circuit for performing the operations described in reference to FIGS. 2-6. The description herein emphasizes the structural independence of the aspects of the calibration system 150 and illustrates one grouping of operations and responsibilities of the calibration system 150. Other groupings that execute similar overall operations are understood within the scope of the present application. A circuit may be implemented in hardware and/or as computer instructions on a non-transient computer readable storage medium, and such circuits may be distributed across various hardware or computer based components. More specific descriptions of certain embodiments of controller operations are included in the section referencing FIGS. 2-5.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The update management system 100 is also shown to include a telematics system 140. In some embodiments, the telematics system 140 may include a delivery circuit for performing the operations described in reference to FIGS. 3, 4, and 6. The telematics system 140 may be interoperable with the calibration system 150 such that the telematics system 140 may be provided by one or more third parties (e.g., one or more parties independent or otherwise separate from the calibration system 150) that provide or otherwise design each telematics system 140 to communicatively couple to the calibration system 150. For example, any third party's telematics system 140 that at least adheres to the operability requirements required to enable a communication interface and/or to utilize programmatic development tools as described herein below may be communicatively coupled to the calibration system 150. Accordingly, the telematics system 140 may correspond to a mixed fleet (e.g., equipment such as vehicles or engines developed by different manufacturers) or a similar fleet (e.g., equipment such as vehicles or engines developed by the same manufacturer). In this regard, the calibration system 150 is structured for agnostic operability with the telematics system 140 such that the calibration system 150 is structured to be compatible with, operate with, or otherwise communicatively couple to any telematics system 140 provided that the telematics system 140 at least adheres to the operability requirements required to enable a communication interface and/or to utilize programmatic development tools as described herein below.

The telematics system 140 may also include a communications interface for communicating with the calibration system 150, telematics unit 120, and/or the control system 130 of the update management system 100. In some embodiments, the communication interface may take the form of or otherwise communicate with one or more application programming interfaces (e.g., a cloud API structured for infrastructure, service, and/or application features) included in, or otherwise accessible by, the calibration system 150. The communication interface may be operable via program development tools (e.g., a software development kit (SDK), programmatic framework, etc.) structured to develop or otherwise communicate with a cloud connected application system or platform (e.g., the calibration system 150) structured to utilize, execute, or otherwise access representational state transfer (REST) application programming interfaces (APIs), a simple object access protocol, a specific programmatic framework, hardware platform, operating system, one or more embedded systems, etc. In some embodiments, the telematics system 140 may request data (e.g., calibration data, updated calibration data, etc. as described herein below) and computations, via a direct and/or indirect application programming interface (e.g., a direct or indirect cloud connected APIs) associated with the calibration system 150. In further embodiments, the application programming interface may be based across one or more cloud connected application systems or platforms. To that end, one or more requests (e.g., calls structured to include HTTP verbs, such as but not limited to, GET, DELETE, POST, PUT, etc.) to the application programming interface may access, utilize, or otherwise communicate with one or more cloud connected application systems or platforms.

The communication interface may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In other embodiments, a local area network (LAN), a wide area network (WAN), or an external computer (for example, through the Internet using an Internet Service Provider) may provide, facilitate, and support communication between the telematics system 140 and the calibration system 150. All such variations are intended to fall within the spirit and scope of the present disclosure.

The update management system 100 is also shown to include a telematics unit 120. The telematics unit 120 may be structured as any type of telematics controller or circuitry to perform certain operations such as those described herein in relation to FIG. 4. Accordingly, the telematics unit 120 may include, but is not limited to, a location positioning system (e.g., global positioning system) to track the location of a vehicle (e.g., latitude and longitude data, elevation data, etc.), one or more memory devices for storing calibration data, tracked data, or any other data associated with the equipment 110, one or more electronic processing units for processing data and a communications interface for facilitating the exchange of data between the telematics unit 120, telematics system 140, and one or more control systems 130. In this regard, the communications interface may be structured as any type of communications interface or protocol including, but not limited to, Wi-Fi, WiMax, Internet, Radio, Bluetooth®, Zigbee, satellite, radio, cellular, GSM, GPRS, LTE, etc. In some embodiments, the communication between the telematics unit 120 and the control system 130 is via the unified diagnostic services (UDS) protocol. Alternatively or additionally, a controller area network (CAN) bus including any number of wired and wireless connections provides the exchange of signals, information, and/or data between the telematics unit 120 and the control system 130.

The telematics unit 120 includes a transmitter structured to generate radio frequency transmissions via one or more transmission protocols. The telematics unit 120 further includes a receiver structured to receive radio frequency transmissions. In some embodiments, the transmitter and the receiver may take the form of a transceiver or a transmitter-receiver structured to send and receive radio frequency transmissions.

Figure 5A:
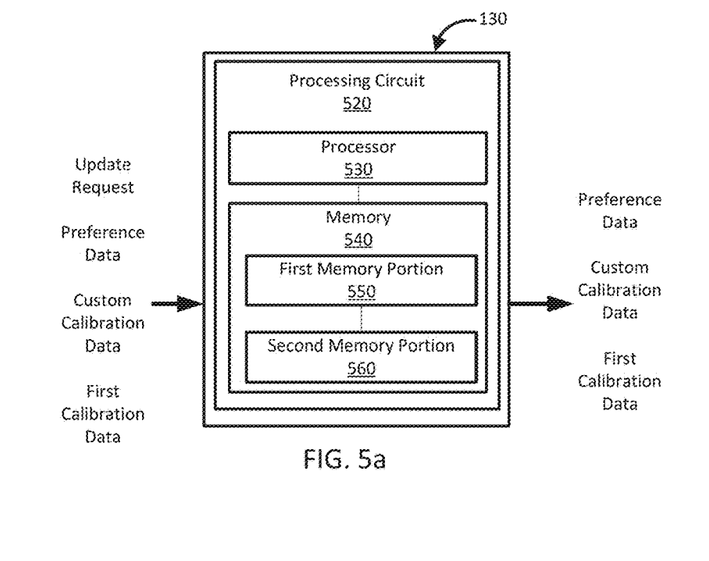
FIG. 5a is a schematic block diagram of a control system included in the update management system according to an example embodiment.
Figure 5B:
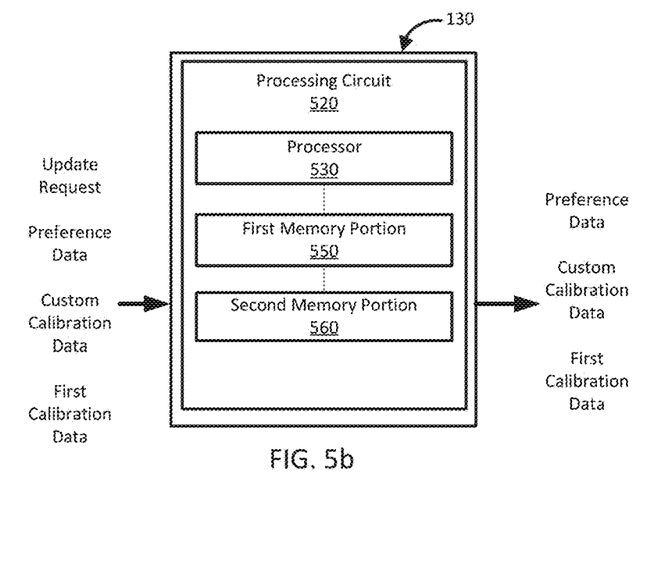
FIG. 5b is a schematic block diagram of a control system included in the update management system according to an example embodiment.

The update management system 100 also includes the control system 130 structured to perform certain operations such as those described herein in relation to FIGS. 5a and 5b. In certain embodiments, the control system 130 forms a portion of a processing subsystem including one or more computing devices having memory, processing, and communication hardware. The control system 130 may include a microprocessor, an application-specific integrated circuit (ASIC), a field-programmable gate array (FPGA), etc., or combinations thereof. The control system 130 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the control system 130 can read instructions. The instructions may include code from any suitable programming language. The control system 130 may be a single device or a distributed device, and the functions of the control system 130 may be performed by hardware and/or as computer instructions on a non-transient computer readable storage medium.

The control system 130 is also structured to receive, acquire, and/or interpret data from one or more components in or otherwise associated with the equipment 110 (e.g., a truck or other vehicle). As such, the control system 130 may be communicably coupled to one or more sensors corresponding to the equipment. For example, the control system 130 may receive engine speed and engine torque data from each of an engine speed sensor and an engine torque sensor, respectively. For tracking, compartmentalization, and analytics, each piece of data may correspond to a data identifier (DIDs) (e.g., a code, value, etc.). The control system 130 may also receive data from an on-board diagnostics system (e.g., OBD II, OBD I, EOBD, JOBD, etc.). As such, the control system 130 may receive diagnostic trouble codes (DTCs) based on one or more operating characteristics of a component in the equipment 110. The DTCs may include fault codes, parameter IDs, etc.

Figures 2, 4:
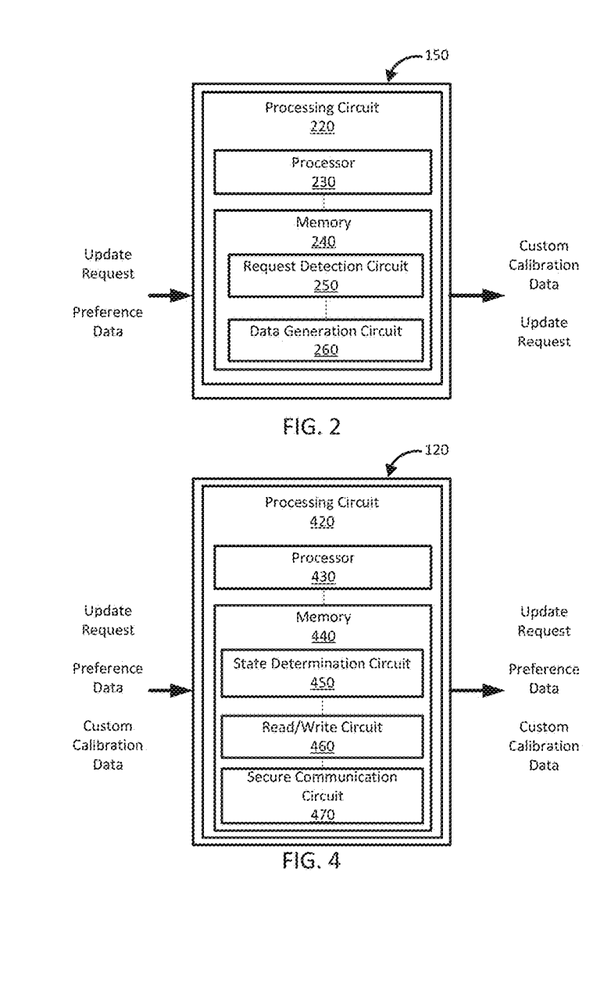
FIG. 2 is a schematic block diagram of a calibration system according to an example embodiment.
FIG. 4 is a schematic block diagram of a telematics unit included in the update management system according to an example embodiment.

FIG. 2 is a schematic block diagram of a calibration system 150 included in the update management system 100 according to an embodiment. The calibration system 150 (e.g., a first cloud connected application system) is communicatively coupled (e.g., via an over air transfer, the Internet, any type of network as described herein, etc., or a combination thereof) to the telematics system 140 (e.g., a second cloud connected application system). In further embodiments, the calibration system 150 is communicatively coupled (e.g., via the telematics system 140, telematics unit 120, or a combination thereof) to a control system 130. In some embodiments, calibration system 150 (e.g., the first cloud connected application system) may be communicatively coupled to one or more telematics systems 140 (e.g., one or more second cloud connected application systems) such that one or more calibration systems 150 and/or telematics units 140 are structured to carry out the features as described herein. In the present embodiment, the calibration system 150 includes a processing circuit 220, a processor 230, memory 240, or other computer readable medium. It should be understood that the calibration system 150 of FIG. 2 depicts only one embodiment of the calibration system 150, and any other system capable of performing the operations described herein can be used.

The processor 230 can include a microprocessor, programmable logic controller (PLC) chip, an ASIC chip, or any other suitable processor. The processor 230 is in communication with the memory 240 and structured to execute instructions, algorithms, commands, or otherwise programs stored in the memory 240.

The memory 240 includes any of the memory and/or storage components discussed herein. For example, the memory 240 may include RAM and/or cache of the processor 230. The memory 240 may also include one or more storage devices (e.g., flash drives, hard drives, computer readable media, etc.) either local or remote to the calibration system 150. The memory 240 is structured to store look up tables, algorithms, or instructions.

The calibration system 150 includes a request detection circuit 250. The request detection circuit 250 is structured to determine a calibration update request corresponding to the control system 130. In this regard, the request detection circuit 250 may be structured to receive, via the telematics system 140, the calibration update request corresponding to a control system 130 (e.g., electronic control system). To determine which equipment 110 (e.g., an engine associated with a vehicle) requires a calibration update, the calibration system 150 periodically receives calibration data (e.g., calibration data provided by the equipment 110 or otherwise associated with an engine structured to receive calibration updates) via the telematics system 140 and/or the telematics unit 120. In some embodiments, the request detection circuit 250 may receive a calibration update request in response to a user or operator of the equipment providing an input (e.g., an input structured to indicate a calibration update request) when the user or operator takes a different route or path to optimize fuel economy. In turn, the calibration system 150 determines whether the calibrations associated with the equipment 110 are due for an update. For example, the connected calibration system 150 determines whether there is updated calibration data (e.g., data structured to include new features, programmatic changes, parameter changes, data packages, or a combination thereof) for the control system 130 of the equipment 110.

Alternatively or additionally, the request detection circuit 250 may be structured to generate the calibration update request corresponding to the control system 130. To that end, the request detection circuit 250 may be structured to generate, store, or otherwise access a calibration update repository comprising the equipment 110 associated with updated calibration data. For example, the request detection circuit 250 may be structured to generate a calibration update repository such that the equipment 110 (e.g., control systems, engines, etc.) in need of updated calibration data is identified or otherwise included in the calibration update repository. The request detection circuit 250 may generate the calibration update request based on the equipment 110 that includes the control system 130 and/or the equipment 110 identified in the calibration update repository. In turn, the request detection circuit 250 may provide the calibration update request indirectly (e.g., via the telematics system 140) and/or directly (e.g., to the telematics units 120) to the control system 130. In some embodiments, the calibration update request may be output (e.g., displayed) as a status notification (e.g., a digital notification such as an alert via a display associated with the equipment, vehicle dash, infotainment system, or information system, or any device configured for in-app notifications, short message service message, audio message, video, streaming content, or any other digital content) structured to communicate the calibration update request to a user or operator of the equipment 110. For example, a status notification such as "User the Diagnostic System has detected that updated calibration data will improve the vehicle performance" may be output to communicate the calibration update request to a user or operator of the equipment 110. In further examples, the status notification may be output to communicate the calibration update request to an operator (e.g., fleet manager, home office personnel, etc.) of the update management system 100. Accordingly, the calibration update request may be output (e.g., displayed via a fleet portal) as a status notification to be reviewed and/or approved by an operator (e.g., a fleet manager).

The calibration system 150 includes a data generation circuit 260. The data generation circuit 260 is structured to generate custom calibration data based, at least in part, on the calibration update request. As used herein, the term "custom calibration data" may be used to refer to data and/or programmatic instructions that includes first calibration data (e.g., calibration data currently utilized by the equipment), updated calibration data (e.g., data structured to include new features, programmatic changes, parameter changes, data packages, or a combination thereof), any other data associated with the equipment (e.g., the vehicle, engine, control system, or any other system associated with the equipment), user preference data such as user settings or data otherwise configured according to user preference, or any other combination thereof). For example, the custom calibration data may include control parameters configured via the control system 130. In some embodiments, the data generation circuit 260 receives the user preference data from the control system 130. The user preference data may be provided via the telematics unit 120. Alternatively or additionally, the user preference data may be provided via the telematics system 140. For example, the user preference data such as the control parameters may be read from the control system 130 by the telematics unit 120. In turn, the user preference data may be received by the data generation circuit 260 via the telematics system 140.

The data generation circuit 260 is further structured to read the user preference data provided by the telematics unit 120 and/or the telematics system 140. In further embodiments, the data generation circuit 260 generates custom calibration data based, at least in part, on the user preference data. For example, the data generation circuit 260 determines whether to include at least a portion of the user preference data with the updated calibration data and writes the user preference data into the updated calibration data to, thereby, generate custom calibration data. Advantageously, the inclusion of the user preference data in the custom calibration data preserves the previously defined user settings for each control system 130. Alternatively or additionally, the data generation circuit 260 is structured to determine the validity of the custom calibration data based, at least in part, on predefined rules. In further embodiments, the data generation circuit 260 calculates a validity value (e.g., a cyclical redundancy check, CRC, value). The validity value may be utilized by the control system 130 to validate that the custom calibration data has been properly received (e.g., a complete re-flash has been performed).

Figure 3:
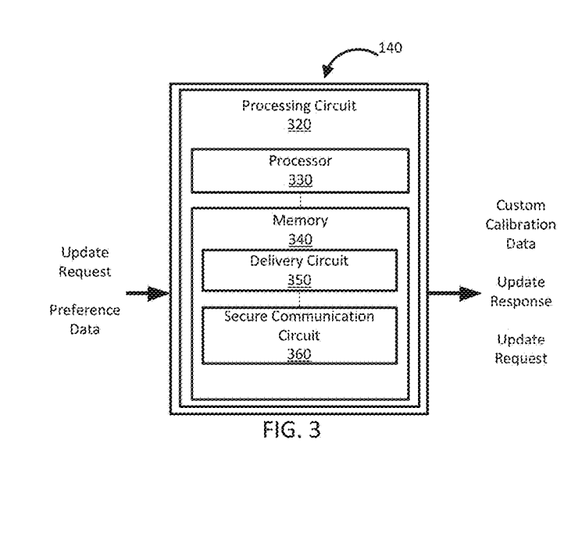
FIG. 3 is a schematic block diagram of a telematics system included in the update management system according to an example embodiment.

FIG. 3 is a schematic block diagram of a telematics system 140 included in the update management system 100 according to an embodiment. The telematics system 140 may be communicatively coupled (e.g., via an over air transfer, the Internet, any type of network as described herein, etc., or a combination thereof) to the calibration system 150, telematics unit 120, and control system 130. In the present embodiment, the telematics system 140 includes a processing circuit 320, a processor 330, memory 340, or other computer readable medium. It should be understood that the telematics system 140 of FIG. 3 depicts only one embodiment of the telematics system 140, and any other telematics system capable of performing the operations described herein can be used. The processing circuit 320, processor 330, memory 340, or other computer readable medium may be similar to the similarly named components described above with respect to FIG. 2, therefore, these components are not again described for the sake of brevity.

The telematics system 140 includes a delivery circuit 350. The delivery circuit 350 is structured to provide, via an over air transfer, the custom calibration data to the telematics unit 120. For example, the delivery circuit 350 facilitates the accessibility of the custom calibration data via one or more application programming interfaces (e.g., a cloud API structured for infrastructure, service, and/or application features). The custom calibration data may be received (e.g., downloaded, accessed, or otherwise provided) by the telematics unit 120 corresponding to the control system 130 to receive the update. In an example embodiment, the custom calibration data may be downloaded or otherwise received by the electronic control system included in the engine corresponding to the equipment (e.g., vehicle, generator set, etc.).

Alternatively or additionally, the telematics system 140 includes a secure communications circuit 360. As described above, the telematics system 140 is structured to operate wirelessly via an over air transfer, a wireless chip, wireless circuit, wireless communication network, or combination thereof. In an example embodiment, the secure communication circuit 360 may utilize wireless communication (e.g., an over air transfer structured for application development (e.g., Software Development Kit (SDK)) operability which includes application programming interfaces (e.g., REST APIs) and Datalink protocols) to enable a communication channel between the control system 130, the telematics system 140, and the calibration system 150. In this regard, the secure communication circuit 360 is structured to establish a secure communication channel between the calibration system 150, telematics system 140, telematics unit 120, and/or the control system 130. In some example embodiments, the secure communication channel may be established via the telematics unit 120.

The secure communication channel may be established based, at least in part, on a learning access process such that the telematics system 140 (via the secure communication circuit 360) requests a seed from the control system 130. In this regard, the telematics system 140 may request a seed from the control system 130 via the telematics unit 120. The secure communication circuit 360 is further structured to provide (e.g., transmit, via an over air transfer, or otherwise make accessible) the seed to the connected calibration system 150 (e.g., a first cloud connected application system structured to utilize or otherwise access REST APIs). In response to receiving the seed, the secure communication circuit 360 receives an access identifier (e.g., a unique key structured to access the control system 130) provided by the connected calibration system 150. The secure communication circuit 360 further provides the access identifier to the control system 130 to establish a secured session (e.g., an encrypted session) with the control system 130. Advantageously, the secure communication circuit 360 reduces security vulnerabilities by facilitating the secure transfer of data to the control system 130. Some example embodiments for requesting a seed and establishing a secure communication channel with the control system 130 via telematics are described further in co-pending PCT International Application no. PCT/US16/53755 filed Sep. 26, 2016, and entitled "System, Method, And Apparatus For Secure Telematics Communication," which is herein incorporated by reference in its entirety.

FIG. 4 is a schematic block diagram of a telematics unit 120 included in the update management system 100 according to an embodiment. The telematics unit 120 may be communicatively coupled to the telematics system 140, calibration system 150, and/or control system 130. In the present embodiment, the telematics unit 120 includes a processing circuit 420, a processor 430, memory 440, or other computer readable medium. It should be understood that the telematics unit 120 of FIG. 4 depicts only one embodiment of the telematics unit 120, and any other telematics unit capable of performing the operations described herein can be used. The processing circuit 420, processor 430, memory 440, or other computer readable medium may be similar to the similarly named components described above with respect to FIG. 2, therefore, these components are not again described for the sake of brevity.

The telematics unit 120 includes a read/write circuit 460. The read/write circuit 460 is structured to receive or otherwise read the custom calibration data provided via the telematics system 140, the calibration system 150 or any other device capable of communicating with the control system 130. In further embodiments, the telematics unit 120 includes a state determination circuit 450. The state determination circuit 450 is structured to provide, via an over air transfer, the custom calibration data to the second memory portion 560 corresponding to the control system 130. For example, the custom calibration data may be provided to the second memory portion 560 of the memory 540 in preparation for being received by, or provided to, the first memory portion 550 (e.g., main memory or any other non-volatile memory) as illustrated with reference to FIG. 5a. In some embodiments, the first memory portion 550 may be separate from the second memory portion 560 as illustrated in FIG. 5b. The second memory portion 560 may take the form of flash memory, buffer memory, auxiliary memory, or any other memory described herein. In this regard, the custom calibration data may be provided to at least a portion of the second memory portion 560 during an active engine state (e.g., while the electronic control system is running, when the engine is in an "on" position, etc.). Advantageously, providing the custom calibration data to at least a portion of the second memory portion 560 during an active engine state reduces the equipment (e.g., the engine associated with the equipment 110) downtime by enabling the custom calibration data to be provided to the second memory portion (e.g., a serial flash memory chip) while the first calibration data or other data (e.g., control system data, engine data, etc.), programmatic code, and/or applications continue to execute via the first memory portion (e.g., the main memory). Alternatively or additionally, the custom calibration data may be provided to at least a portion of the second memory portion 560 during an inactive engine state (e.g., when the electronic control system has shut down, when the engine is in an "off" position, etc.). Accordingly, the equipment 110 (e.g., the vehicle, engine, etc.) is not required to be brought into a service center and service personnel does not need to be dispatched to update the calibration data as described herein above.

The state determination circuit 450 is further structured to monitor the state (e.g., the active engine state, inactive engine state, or the like) of the equipment (e.g., the engine associated with the equipment 110) in response to the receipt of the custom calibration data by the second memory portion 560. If the state determination circuit 450 determines an active engine state, the state determination circuit 450 generates a status notification (e.g., a digital notification such as an alert via the onboard diagnostic system (OBD), a display associated with the equipment, vehicle dash or information system, etc.) structured to communicate the state of the equipment 110 to a user or operator of the equipment 110. For example, the status notification may be output to an in-dash display, an on-board diagnostic system (OBD), or any other device corresponding to the control system 130 to indicate to the operator of the equipment 110 that custom calibration data is available for the equipment (e.g., the electronic control system, engine, etc.), but cannot be installed at this time because the equipment is not in the inactive engine state. The status notification may also include information about the required conditions that would allow the operator to complete the installation.

If the state determination circuit 450 determines an inactive engine state (e.g., an engine "off" state or "stopped" state), the state determination circuit 450 generates a command structured to provide the custom calibration data to the first memory portion 550. When the equipment 110 is in the inactive state, the equipment 110 is in an unengaged state such that the custom calibration data can be provided to the first memory portion 550. For example, if the state determination circuit 450 determines the engine is in an "off" or "stopped" state, the state determination circuit 450 generates a command to the control system 130 (e.g., the electronic control system) to re-flash the main memory with the custom calibration data. In other example embodiments, the state determination circuit 450 generates a command structured to provide the custom calibration data to the first memory portion 550 in response to a user or operator input. For example, the state determination circuit 450 may receive an input structured to initiate an update to the control system (e.g., the electronic control system) at the convenience of the operator of the equipment 110. In turn, the state determination circuit 450 generates a command structured to provide the custom calibration data to the first memory portion 550.

In further embodiments, the read/write circuit 460 may be structured to transmit the first calibration data from the first memory portion 550 to the second memory portion 560 during the active engine state or the inactive engine state such that a copy or back-up of the first calibration data is generated. The memory portion 540 is structured to at least accommodate the inclusion of the custom calibration data, the first calibration data, and any other data, in the second memory portion 560. For example, the second memory portion may be at least twice as large as the first memory portion such that the second memory portion is structured to receive or otherwise buffer the custom calibration data and the first calibration data (e.g., a copy or back-up of the first calibration data or the first calibration data without being copied).

If a problem occurs when the custom calibration data is transmitted to the first memory portion 550 and/or an input is provided by a user or operator of the equipment to utilize the first calibration data instead of the custom calibration data, the first calibration data is transmitted from the second memory portion 560 to the first memory portion 550 such that the first calibration data is restored to main memory or any other non-volatile memory. For example, the input provided by the user or operator (e.g., a fleet manager) may be provided at a time convenient for the user, operator, fleet manager, engineer, etc. To that end, the first calibration data may be transmitted from the second memory portion 560 to the first memory portion 550 (e.g., the "user initiated" restore) at a later time such as when the operator provides an input to initiate a restore based on, for example, the operator's dislike of the truck performance after the update has been completed. Yet in other embodiments, the first calibration data may be transmitted from the second memory portion 560 to the first memory portion 550 when the engineer provides an input to initiate a restore based on, for example, a detection that the calibration file was sent erroneously. Custom calibration data that has not successfully installed may be displayed (e.g., highlighted) via a user interface, application, web portal, etc. or combination thereof. The input may be provided using a display associated with the equipment, user interface, application, web portal, etc. communicatively coupled to the calibration system and/or the telematics system.

The control system 130 includes a processing circuit 520, a processor 530, memory 540, or other computer readable medium. It should be understood that the control system 130 is not limited to the embodiments of FIGS. 5a and 5b, and any other controller capable of performing the operations described herein can be used. The processing circuit 520, a processor 530, memory 540, or other computer readable medium may be similar to the similarly named components described above with respect to FIG. 2, therefore, these components are not again described for the sake of brevity.

Figure 6:
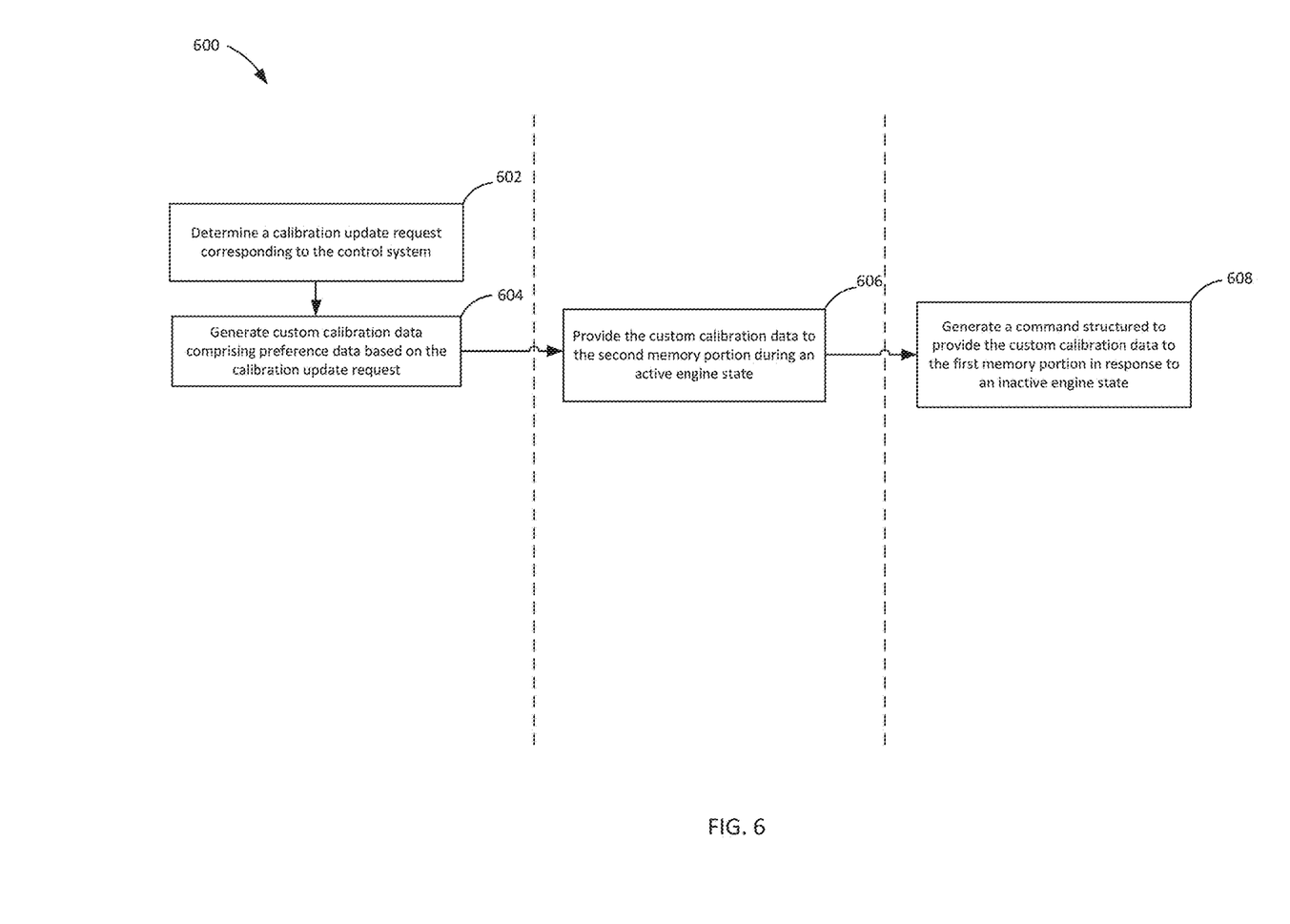
FIG. 6 is a schematic flow diagram of an example method of updating the control system.

FIG. 6 is a flow diagram of an example process 600 for a calibration system to update the calibration data of a control system through telematics via the circuitry described herein with reference to FIGS. 1-5. At 602, the process 600 includes determining, via the calibration system, a calibration update request corresponding to the control system. The calibration system periodically receives, via the telematics system 140, calibration data (e.g., calibration data provided by the equipment or otherwise associated with an engine structured for calibration updates such as parameter settings corresponding to a vehicle) to determine which equipment (e.g., an engine, electronic control system, etc. associated with a vehicle) may benefit from a calibration update. For example, the connected calibration system determines whether there is updated calibration data available for the control system associated with a vehicle.

At 604 custom calibration data may be generated by the calibration system. The custom calibration data may be based, at least in part, on the calibration update request. The custom calibration data includes data and/or programmatic instructions that includes first calibration data (e.g., calibration data currently utilized by the equipment), updated calibration data, any other data associated with the equipment (e.g., the engine, control system, or any other system associated with the equipment), user preference data such as user settings or data otherwise configured according to user preference, or any other combination thereof. The user preference data may be provided via the telematics unit. Alternatively or additionally, the user preference data may be provided via the telematics system. For example, user preference data such as the control parameters may be read, via telematics unit, from the control system. In turn, the user preference data may be received by the calibration system via the telematics system and, thereby, utilized to generate the custom calibration data.

At 606, the custom calibration data may be provided to the second memory portion corresponding to the control system by the telematics unit. For example, the custom calibration data may be provided to buffer memory in preparation for being received by, or provided to, the first memory portion (e.g., main memory or any other non-volatile memory). In some example embodiments, the custom calibration data may be provided to at least a portion of the second memory portion during an active engine state (e.g., when the engine is in an "on" position) while the first calibration data or other data (e.g., control system data, engine data, etc.), programmatic code, and/or applications continue to execute via the first memory portion (e.g., the main memory). Alternatively or additionally, the custom calibration data may be provided to at least a portion of the second memory portion during an inactive engine state (e.g., when the engine is in an "off" or "stopped" position).

A command structured to provide the custom calibration data to the first memory portion may be generated by the telematics unit at 608. The custom calibration data may be provided to the first memory portion based, at least in part, on the state (e.g., an active engine state, inactive engine state, etc.) of the equipment. If the telematics unit determines an active engine state, the telematics unit generates a status notification (e.g., a display associated with the equipment, vehicle dash or information system, etc.) to communicate the state of the equipment (e.g., that the engine is not in the inactive state) to a user or operator of the equipment. For example, the status notification may be output (e.g., displayed) to indicate to the operator of the equipment 110 that custom calibration data is available for the equipment (e.g., the engine), but cannot be installed at this time because the equipment is not in the inactive engine state. The status notification may also include information about the required conditions that would allow the operator to complete the installation. If the telematics unit determines an inactive engine state (e.g., an engine "off" state or "stopped" state), the telematics unit may generate a command structured to provide the custom calibration data to the first memory portion. In turn, the telematics unit generates a command to re-flash the first memory portion (e.g., main memory) of the control system (e.g., the electronic control system) with the custom calibration data.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for.".

What is claimed is:

1. A method comprising:
    determining, by a cloud-based system, a calibration update request corresponding to a control system of a vehicle, the control system comprising a first memory portion and a second memory portion;
    generating, by the cloud-based system, custom calibration data based on the calibration update request;
    providing, by the cloud-based system, the custom calibration data to the second memory portion during an active engine state; and
    generating, by the cloud-based system, a command structured to provide the custom calibration data to the first memory portion during an inactive engine state.

2. The method of claim 1, further comprising receiving the calibration update request corresponding to the control system.

3. The method of claim 1, wherein first calibration data is caused, by the cloud-based system, to be transmitted from the first memory portion to the second memory portion during the active engine state or the inactive engine state so that a back-up copy of the first calibration data is provided in the second memory portion.

4. The method of claim 3, further comprising receiving an input to utilize the first calibration data and, in response, causing transmission of the first calibration data from the second memory portion to the first memory portion.

5. The method of claim 1, wherein the custom calibration data comprises preference data, updated calibration data, or a combination thereof.

6. An apparatus comprising:
    a calibration system structured to:
        determine a calibration update request corresponding to a control system of a vehicle, the control system comprising a first memory portion and a second memory portion;
        generate custom calibration data comprising preference data based on at least one of the calibration update request or the preference data; and
        provide the custom calibration data during at least one of an active engine state or an inactive engine state of the vehicle, wherein the custom calibration data is transmitted from the second memory portion to the first memory portion in response to the inactive engine state.

7. The apparatus of claim 6, wherein the calibration system is structured to utilize one or more application programming interfaces.

8. The apparatus of claim 6, wherein the calibration system is further structured to generate, via at least one of a direct or indirect application programming interface, the calibration update request corresponding to the control system.

9. The apparatus of claim 6, wherein the calibration system is further structured to generate a calibration update repository comprising equipment associated with updated calibration data.

10. The apparatus of claim 6, wherein the calibration system is further structured to provide an access identifier structured to establish a secured session with the control system.

11. The apparatus of claim 6, wherein the calibration system is communicatively coupled to a telematics system structured to utilize one or more application programming interfaces and a telematics unit provided with the vehicle.

12. The apparatus of claim 6, wherein the calibration system is communicatively coupled to a telematics unit structured to generate a command structured to transmit first calibration data from the first memory portion to the second memory portion during the active engine state or the inactive engine state.

13. The apparatus of claim 12, wherein calibration system is communicatively coupled to the telematics unit structured to generate a command structured to transmit the first calibration data from the second memory portion to the first memory portion.

14. A calibration system for remotely updating calibration data of a control system of a vehicle, the calibration system comprising:
    at least one processing circuit coupled to at least one memory device that stores instructions that, when executed by the at least one processing circuit, cause the calibration system to perform operations comprising:

determine a calibration update request corresponding to the control system of the vehicle;
generate custom calibration data comprising preference data based on the calibration update request;
provide the custom calibration data to a second memory portion of the control system of the vehicle during an active engine state; and
provide the custom calibration data to a first memory portion of the control system of the vehicle in response to receiving an indication of an inactive engine state.

15. The system of claim 14, wherein the calibration system is further structured to receive the calibration update request corresponding to the control system.

16. The system of claim 14, wherein the calibration system is further structured to generate the calibration update request corresponding to the control system.

17. The system of claim 14, wherein the calibration system is structured to operate wirelessly via over air transfer, a wireless chip, wireless circuit, wireless communication network, or a combination thereof.

18. A non-transitory computer-readable medium storing instructions that, when executed by one or more processors, cause the one or more processors to perform operations comprising:
determining a calibration update request corresponding to a control system of a vehicle, the control system comprising a first memory portion and a second memory portion;
generating custom calibration data comprising preference data based on the calibration update request;
providing the custom calibration data to the second memory portion during an active engine state or an inactive engine state; and
generating a command structured to provide the custom calibration data to the first memory portion in response to an inactive engine state.

* * * * *